(12) United States Patent
Chiba et al.

(10) Patent No.: US 9,803,933 B2
(45) Date of Patent: Oct. 31, 2017

(54) COLD STORAGE MEDIUM CONTAINER

(71) Applicant: Sanden Holdings Corporation, Isesaki-shi, Gunma (JP)

(72) Inventors: Tomohiro Chiba, Isesaki (JP); Ryosuke Sakurai, Isesaki (JP); Yuuki Takahashi, Isesaki (JP); Aya Yoshizawa, Isesaki (JP)

(73) Assignee: Sanden Holdings Corporation, Isesaki-shi, Gunma (JP)

( * ) Notice: Subject to any disclaimer, the term of this patent is extended or adjusted under 35 U.S.C. 154(b) by 66 days.

(21) Appl. No.: 14/900,534

(22) PCT Filed: Jun. 24, 2014

(86) PCT No.: PCT/JP2014/066660
§ 371 (c)(1),
(2) Date: Dec. 21, 2015

(87) PCT Pub. No.: WO2014/208535
PCT Pub. Date: Dec. 31, 2014

(65) Prior Publication Data
US 2016/0146547 A1  May 26, 2016

(30) Foreign Application Priority Data

Jun. 26, 2013 (JP) ................................. 2013-133559

(51) Int. Cl.
*F28D 1/04* (2006.01)
*F28D 20/02* (2006.01)
(Continued)

(52) U.S. Cl.
CPC ....... *F28D 20/021* (2013.01); *F28D 1/05391* (2013.01); *F28D 20/02* (2013.01);
(Continued)

(58) Field of Classification Search
CPC ...... F28D 1/0333; F28D 20/021; F28D 20/02; F28D 1/05391; F28D 2021/0085; F28F 3/025; F28F 3/044
(Continued)

(56) References Cited

U.S. PATENT DOCUMENTS 8,978,411 B2 * 3/2015 Yamada ................ F28D 1/0333
62/244
2011/0154855 A1   6/2011 Sasaki et al.
2013/0047663 A1   2/2013 Kamoshida et al.

FOREIGN PATENT DOCUMENTS

CN       102109254 A      6/2011
JP       2005-055073 A    3/2005
(Continued)

OTHER PUBLICATIONS

The State Intellectual Property Office of the People's Republic of China, The First Office Action issued in Patent Application No. CN 201480036476.9, dated Nov. 4, 2016.
(Continued)

*Primary Examiner* — Davis Hwu
(74) *Attorney, Agent, or Firm* — Baker Botts L.L.P.

(57) ABSTRACT

In order to provide a cold storage medium container that can be smoothly and reliably filled with a cold storage medium to thereby increase productivity. In a cold storage medium container 5, a body of the container 5 constituted of a pair of container members 10 and 12, and the body has an inner fin 11 therein and is filled with the cold storage medium through a cold storage medium filling opening 20 at an end of the body therein. Furthermore, in the cold storage medium container, an engagement portion 13 projects toward inside of the body to engage a part of a corrugated end surface at each end of the inner fin 11, to thereby position the inner fin 11 in the body, and a gap is disposed
(Continued)

between the end surface at each end of the positioned inner fin 11 and an inner wall of the body.

2 Claims, 4 Drawing Sheets

(51) Int. Cl.
*F28F 3/02* (2006.01)
*F28F 3/04* (2006.01)
*F28D 1/053* (2006.01)
*F28D 21/00* (2006.01)
*F28D 20/00* (2006.01)

(52) U.S. Cl.
CPC .............. *F28F 3/025* (2013.01); *F28F 3/044* (2013.01); *F28D 2020/0008* (2013.01); *F28D 2020/0013* (2013.01); *F28D 2021/0085* (2013.01); *Y02E 60/145* (2013.01)

(58) Field of Classification Search
USPC .......................................................... 165/151
See application file for complete search history.

(56) References Cited

FOREIGN PATENT DOCUMENTS

| | | |
|---|---|---|
| JP | 2005-221154 | 8/2005 |
| JP | 2007-107755 A | 4/2007 |
| JP | 2007-291937 A | 11/2007 |
| JP | 2010-203631 A | 9/2010 |
| JP | 2011-149684 A | 8/2011 |
| JP | 2011-192730 | 9/2011 |
| JP | 2013-049349 A | 3/2013 |

OTHER PUBLICATIONS

Japan Patent Office, Notification of Reasons for Refusal issued in Patent Application No. JP 2013-133559, dated Nov. 29, 2016.

* cited by examiner

COLD STORAGE MEDIUM CONTAINER

CROSS-REFERENCE TO RELATED APPLICATIONS

This application is a U.S. National Stage Patent Application under 37 U.S.C. §371 of International Patent Application No. PCT/JP2014/066660, filed on Jun. 24, 2014, which claims the benefit of Japanese Patent Application No. JP 2013-133559, filed on Jun. 26, 2013, the disclosures of which are incorporated herein by reference in their entirety.

TECHNICAL FIELD

The present invention relates to a cold storage medium container, constituting a part of a cold storage heat exchanger usable as an evaporator in a refrigeration cycle of a vehicle air conditioner or other apparatus.

BACKGROUND ART

A cold storage heat exchanger typically includes: a plurality of flat refrigerant pipes arranged in parallel to one another at regular intervals with their flat portions facing one another, fins, each of which is disposed in a gap between flat portions of adjacent ones of the refrigerant pipes and contacts air passing through the gap; and a cold storage medium container inserted in rows of the refrigerant pipes and the fins and containing a cold storage medium.

The cold storage heat exchanger is generally used as an evaporator in a refrigeration cycle of a vehicle air conditioner or other apparatus. Thus, a refrigerant supplied through a condenser and an expansion valve by a compressor driven by an engine flows in the refrigerant pipes and evaporates in the pipes. This refrigerant takes heat of vaporization from air flowing in the gap between the flat portions of adjacent refrigerant pipes, and cools air for cooling operation. At this time, cooling capacity is stored by the cold storage medium in the cold storage medium container. Thereafter, when the compressor stops due to engine idling stop or other reasons, the air is cooled by using cooling capacity stored by the cold storage medium so that cooling performance is preserved.

REFERENCE DOCUMENT LIST

Patent Document

Patent Document 1: Japanese Patent Application Laid-open Publication No. 2011-149684

SUMMARY OF THE INVENTION

Problems to be Solved by the Invention

In the typical cold storage heat exchanger, as described in Patent Document 1, for example, in order to increase strength, the cold storage medium container includes a corrugated inner fin disposed between a pair of container members, and peripheral edge portions of the members are brazed to each other so that the cold storage medium container is filled with a cold storage medium.

In such a typical cold storage medium container, however, in filling with the cold storage medium, depending on the position of the inner fin in the container, the inner fin might be an obstacle preventing the cold storage medium from being smoothly filled into the cold storage medium container. Thus, it might take time to fill with the cold storage medium, decreasing efficiency, so it might be difficult to sufficiently fill the container with the cold storage medium.

The present invention has been made by focusing on the abovementioned problems, and an object of the present invention is to provide a cold storage medium container that can be smoothly and reliably filled with a cold storage medium to increase productivity.

Means for Solving the Problems

In order to solve the problems described above, a cold storage medium container according to the present invention that is in contact with refrigerant pipes of a cold storage heat exchanger by brazing and contains a cold storage medium for storing cooling capacity of a refrigerant, has a configuration as below.

In the cold storage medium container according to the present invention, peripheral edge portions of a pair of container members are brazed to each other to form a container body having a cold storage medium filling opening at an end thereof. The container body has an inner fin therein and is filled with the cold storage medium through the cold storage medium filling opening therein. Furthermore, in the cold storage medium container, an engagement portion projects toward an inside of the container body to engage a part of a corrugated end surface at each end of the inner fin, to thereby position the inner fin in the container body, and a gap is disposed between the end surface at each end of the positioned inner fin and an inner wall of the container body.

Effects of the Invention

According to the present invention, the inner fin is disposed at an appropriate position in the body of the cold storage medium container, and a gap formed between the corrugated end surface at each end of the inner fin and the inner wall of the container body serves as a cold storage medium passage when filling the cold storage medium to ensure smooth filling of the cold storage medium, so that productivity is increased.

MODE FOR CARRYING OUT THE INVENTION

Embodiments of the present invention will be hereinafter described with reference to the drawings.

Figure 1:
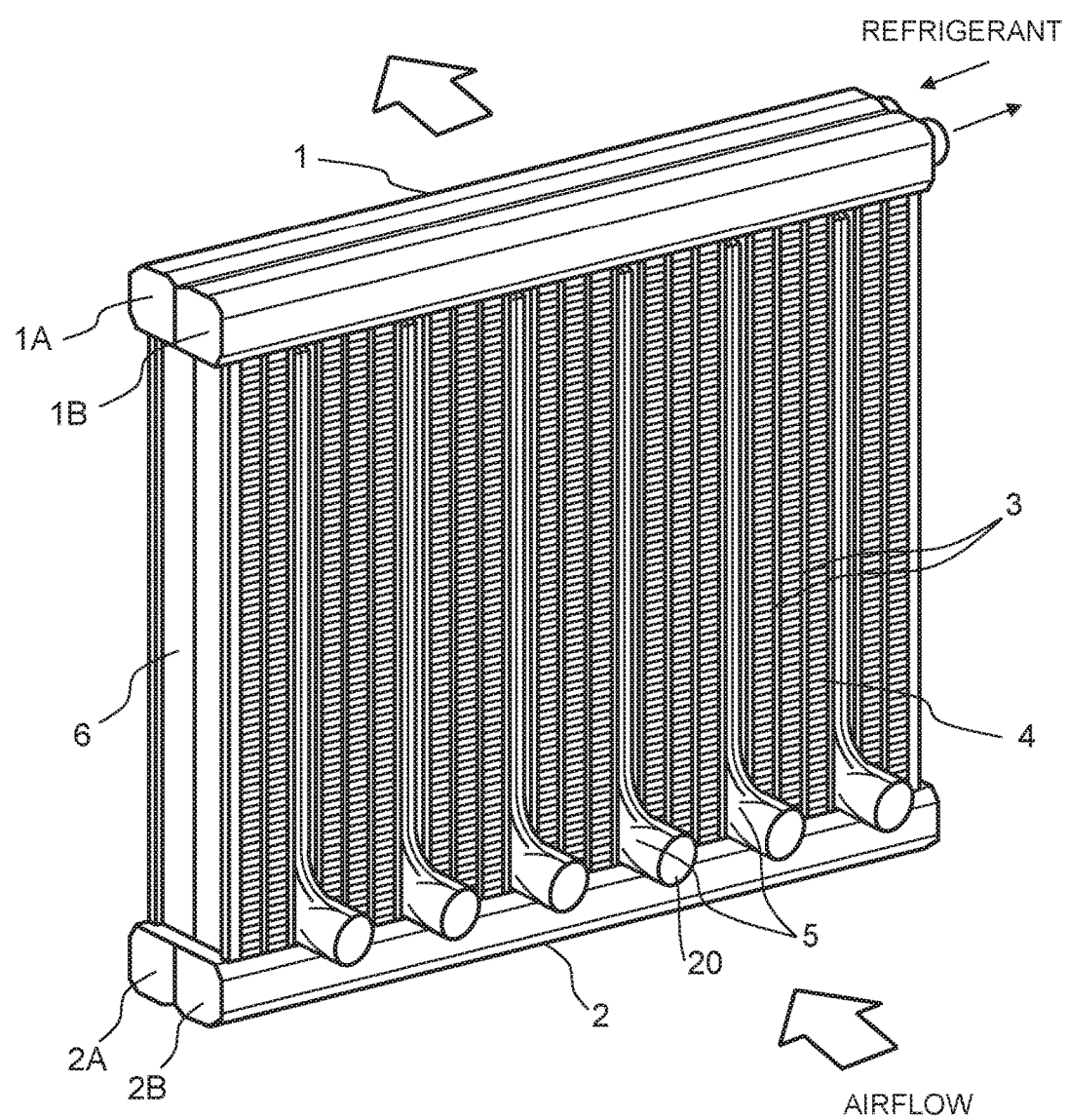
FIG. 1 is an overall perspective view of a cold storage heat exchanger according to an embodiment of the present invention.
Figure 2:
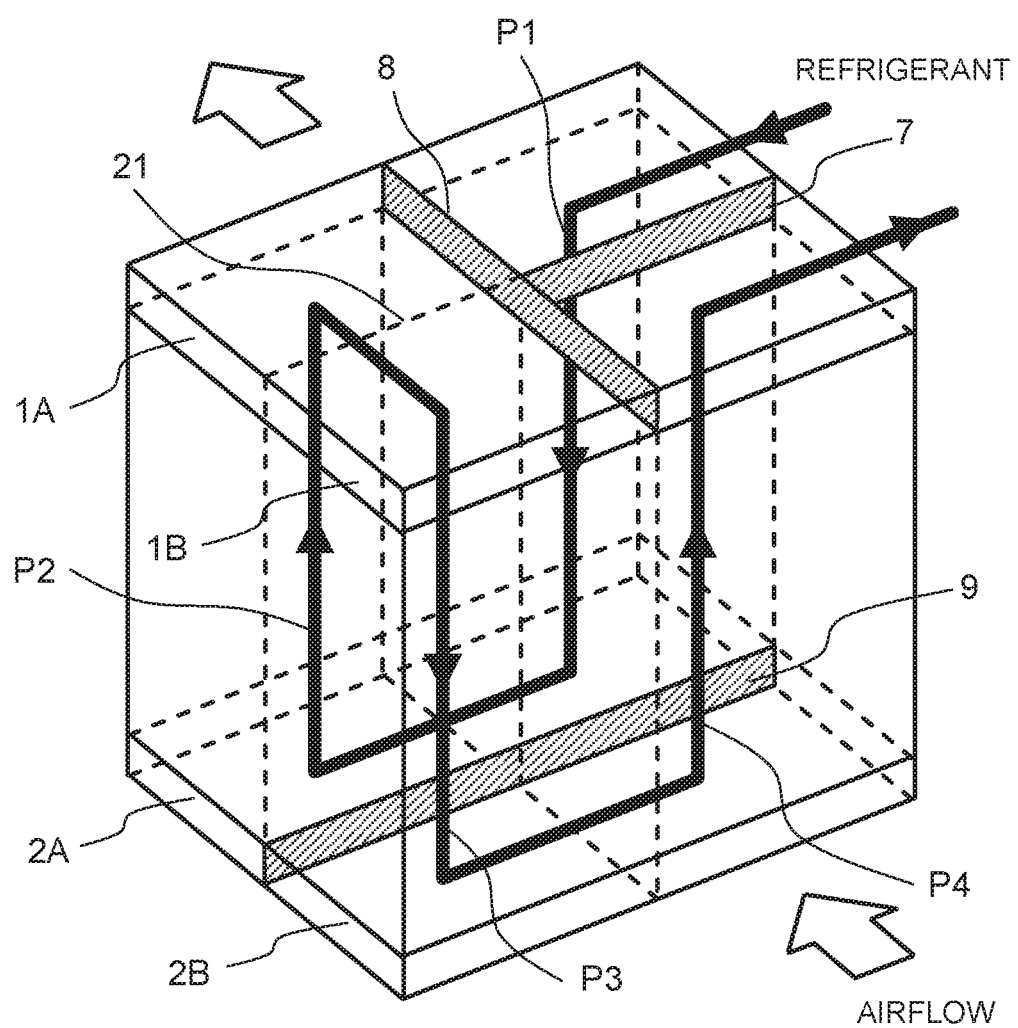
FIG. 2 is a perspective view schematically illustrating a flow of a refrigerant in the cold storage heat exchanger.

FIG. 1 is an overall perspective view of a cold storage heat exchanger (cold storage evaporator) according to an embodiment of the present invention. FIG. 2 is a perspective view schematically illustrating a flow of a refrigerant in the cold storage heat exchanger. An upstream side in an air flow direction to the heat exchanger will be hereinafter referred to as a front side, and a downstream side in the air flow direction will be hereinafter referred to as a rear side.

The cold storage heat exchanger according to this embodiment includes a plurality of flat refrigerant pipes 3 through which an upper header tank 1 and a lower header tank 2 communicate with each other, fins 4 disposed in gaps between adjacent ones of the refrigerant pipes 3 and 3, a plurality of cold storage medium containers 5 disposed in some of the gaps instead of the fins 4, and side plates 6 on both sides of the cold storage heat exchanger.

The upper header tank 1 extends in a horizontal direction, and is divided into two rear and front tanks 1A and 1B that are arranged in a front-and-rear direction perpendicular to the horizontal direction. In this configuration, the rear tank 1A has a refrigerant inlet at an end thereof, and the front tank 1B adjacent to the rear tank 1A has a refrigerant outlet at an end thereof.

In a manner similar to the upper header tank 1, the lower header tank 2 extends in the horizontal direction below the upper header tank 1, and is divided into two rear and front tanks 2A and 2B that are arranged in the front-and-rear direction perpendicular to the horizontal direction.

The refrigerant pipes 3 are flat and arranged side by side at regular intervals with their flat portions facing one another. In this configuration, the refrigerant pipes 3 are arranged in two front and rear rows in such a manner that the rear first row allows the upper tank 1A and the lower tank 2A to communicate with each other and the front second row allows the upper tank 1B and the lower tank 2B to communicate with each other. A gap through which air for exchanging heat with a refrigerant in the refrigerant pipes 3 and 3 passes is formed between the flat portions of adjacent ones of the refrigerant pipes 3 and 3 that are arranged side by side.

The fins 4 are corrugated fins and are each disposed in the gap, that is, between the flat portions of the adjacent refrigerant pipes 3 and 3, in order to increase thermal efficiency.

Each of the cold storage medium containers 5 is a rectangular container containing a cold storage medium, and a cold storage medium filling opening 20 (that is to be closed after filling with the cold storage medium) is formed in a lower end portion of the cold storage medium container 5. The cold storage medium containers 5 are disposed in the gaps between the flat portions of some of adjacent ones of the refrigerant pipes 3 and 3 instead of the fins 4. The fins 4 and the cold storage medium containers 5 are formed across the two front and rear refrigerant pipes 3.

In this embodiment, the refrigerant pipes 3 are partitioned into the front row group and the rear row group. The front row group is further partitioned into two groups, and the rear row group is also further partitioned into two groups. Thus, as illustrated in the schematic view of FIG. 2, the heat exchanger as a whole is partitioned into rear first and second passes (P1 and P2) and front third and fourth passes (P3 and P4) along a flow direction of a refrigerant.

In order to form the first to fourth passes (P1 to P4), the upper header tank 1 (1A, 1B) and the lower header tank 2 (2A, 2B) are partitioned as follows.

Referring to FIG. 2, the tanks 1A and 1B are partitioned by a partition 7 in right portions thereof in a longitudinal direction in FIG. 2, and communicate with each other in a communicating portion 21 in left portions thereof in the longitudinal direction. Each of the tanks 1A and 1B is provided with a partition 8 in a middle portion thereof in the longitudinal direction.

On the other hand, the tanks 2A and 2B of the lower header tank are partitioned by a partition 9 and do not communicate with each other.

In such a four-pass type, a refrigerant is supplied from the compressor driven by the engine through the condenser and the expansion valve, flows into the upper tank 1A through the refrigerant inlet, flows downward in the refrigerant pipes 3 of the first pass P1 from the right half portion of the upper tank 1A in the longitudinal direction in FIG. 2 before the partition 8, and reaches the lower tank 2A. The refrigerant then flows upward in the refrigerant pipes 3 of the second pass P2 from the left half portion of the lower tank 2A to the upper tank 1A, and then reaches the front upper tank 1B from the upper tank 1A through the communicating portion 21.

Thereafter, the refrigerant flows downward in the refrigerant pipes 3 of the third pass P3 from the left portion of the front upper tank 1B to reach the front lower tank 2B. The refrigerant then flows upward in the refrigerant pipes 3 of the fourth pass P4 from the right portion of the lower tank 2B, reaches the front upper tank 1B, and then flows out of the refrigerant outlet.

Here, when a refrigerant flows in the refrigerant pipes 3, the refrigerant cools air passing through the gaps with the fins 4. At this time, cooling capacity is stored in the cold storage medium in the cold storage medium containers 5 disposed between the flat portions of some adjacent ones of the refrigerant pipes 3 and 3. Thereafter, when the compressor stops due to engine idling stop or for other reasons, the air is cooled by using cooling capacity stored in the cold storage medium in the cold storage medium containers 5, so that cooling performance is ensured.

Next, referring to FIGS. 3 and 8, a detailed configuration of the cold storage medium container 5 disposed between some adjacent ones of the refrigerant pipes 3 and 3 will be described.

Figure 3:
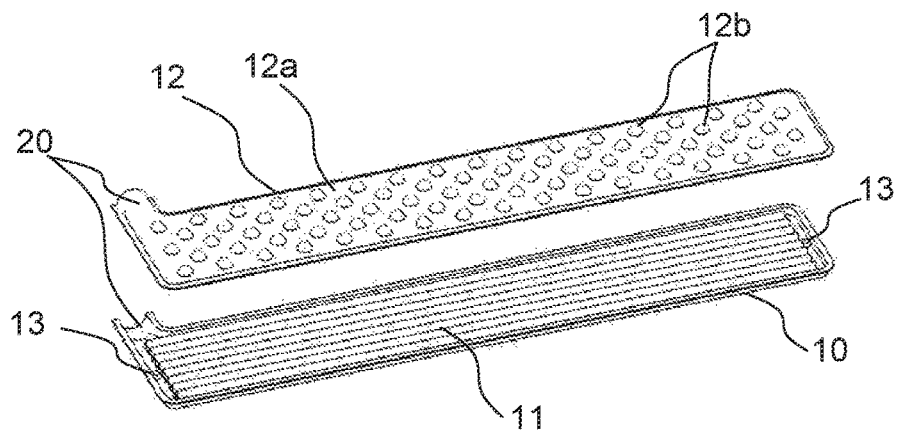
FIG. 3 is an exploded perspective view of a cold storage medium container according to a first embodiment.
Figure 4:
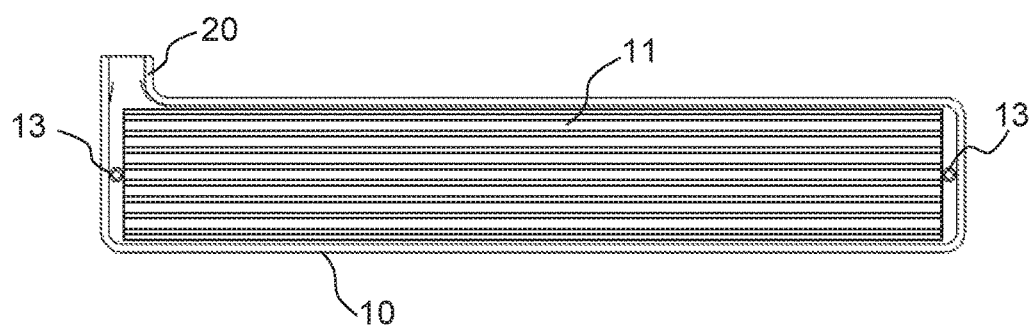
FIG. 4 is an exploded front view of the cold storage medium container of the first embodiment.

FIG. 3 is an exploded perspective view of the cold storage medium container according to a first embodiment of the present invention. FIG. 4 is an exploded front view of the cold storage medium container according to the first embodiment. In the cold storage medium container 5, a container body having a cold storage medium filling opening 20 in an end portion thereof is formed by brazing peripheral edge portions of a pair of rectangular container members (a first side panel 10 and a second side panel 12) to each other.

If the cold storage medium container is hollow, the shape thereof might fail to be maintained under an external pressure and an internal pressure in some cases. Thus, the cold storage medium container needs to have sufficient strength. In view of this, in the cold storage medium container 5 of this embodiment, a rectangular corrugated inner fin 11 for reinforcement is interposed between the first side panel 10 and the second side panel 12.

The first side panel 10 is a rectangular container member having a flat surface 10a, and the flat surface 10a is brazed to the refrigerant pipes 3.

The second side panel 12 includes a plurality of semicircular projections 12b protruding outward from the flat surface 12a, and the top walls of the projections are brazed to the refrigerant pipes 3.

In this manner, an air passageway having a height corresponding to the height of the projections 12b is formed between the flat surface 12a of the second side panel 12 and the refrigerant pipes 3.

As described above, each of the cold storage medium containers 5 including the inner fins 11 therein, is brazed between the refrigerant pipes 3 and 3, is subjected to evacuation, and is then, filled with the cold storage medium through the cold storage medium filling opening 20.

Here, depending on the position of the inner fins disposed between the pair of container members, the corrugated end surfaces of the inner fins might be closed by the container inner wall or a cold storage medium inlet might be closed by the inner fins. Consequently, filling with the cold storage medium takes time, so that production efficiency decreases, and the cold storage medium is not readily distributed to the entire container in some cases.

In order to solve these problems, the following embodiments employ configurations in which the inner fin 11 is appropriately positioned in a body of the cold storage medium container 5 so as to smoothly fill the container 5 with the cold storage medium.

As illustrated in FIGS. 3 and 4, the corrugated pattern of the inner fin 11 is formed in parallel with short sides of the inner fin 11 and the cold storage medium container 5. In order to position the inner fin 11 in the body of the container 5, embossed projections are formed as engagement portions 13 which project toward the inside of the body of the cold storage medium container 5 to be engaged with a part of a corrugated end surface at each end of the inner fin 11. That is, the engagement portions 13 are formed in portions of the bottom surface of the cold storage medium container 5 along the shorter sides thereof so as to be engaged with parts of the end surfaces at both ends of the inner fin 11 having the corrugated pattern formed in parallel with the shorter sides of the cold storage medium container 5. In this manner, the inner fin 11 is positioned in the body of the cold storage medium container 5, and gaps are formed between the corrugated end surfaces at both ends of the inner fin 11 and the inner wall of the body of the cold storage medium container 5.

In this embodiment, the following advantages can be obtained.

The gaps between the corrugated end surfaces at both ends of the inner fin 11 and the inner wall of the body of the cold storage medium container 5 serve as passages of the cold storage medium during filling with the cold storage medium, so that the cold storage medium flows to the corrugated end surfaces at both ends of the inner fin 11 and is easily distributed in the entire container. This configuration ensures that the cold storage medium container 5 is smoothly and reliably filled with the cold storage medium that has entered through the cold storage medium filling opening 20, thereby increasing productivity.

Figure 5:
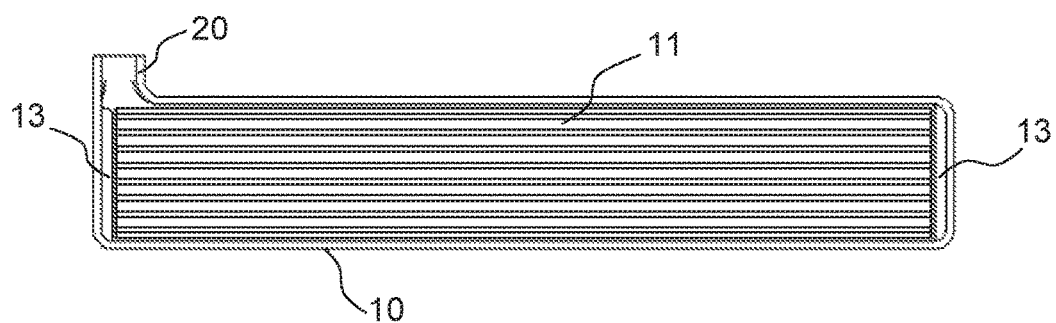
FIG. 5 is an exploded front view of a cold storage medium container according to a second embodiment.
Figure 6:
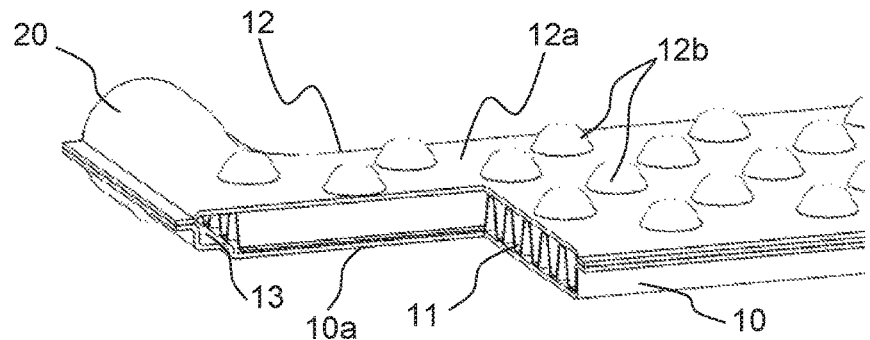
FIG. 6 is a perspective view partially illustrating a cross section of the cold storage medium container of the second embodiment.

FIG. 5 is an exploded front view of a cold storage medium container according to a second embodiment. FIG. 6 is a perspective view partially illustrating a cross section of the cold storage medium container of the second embodiment. As illustrated in FIGS. 5 and 6, as engagement portions 13 engaged with part of corrugated end surfaces at both ends of an inner fin 11 in a manner similar to the first embodiment, a bottom surface of a first side panel 10 projects toward the inside of a container 5 along substantially the entire corrugated end surfaces at both ends of the inner fin 11.

Figure 7:
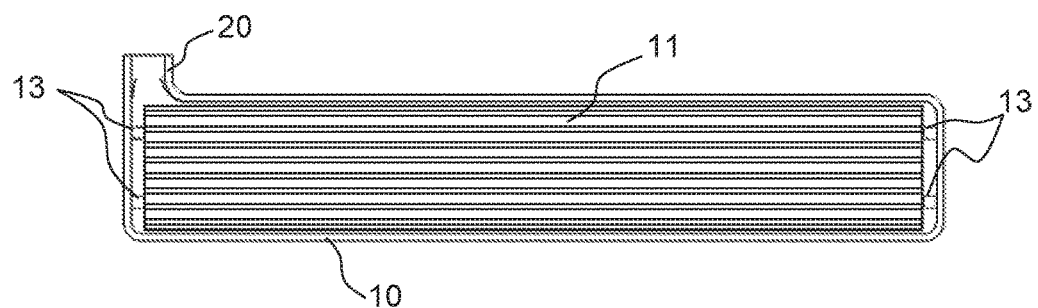
FIG. 7 is an exploded front view of a cold storage medium container according to a third embodiment.

FIG. 7 is an exploded front view of a cold storage medium container according to a third embodiment. As illustrated in FIG. 7, as engagement portions 13 engaged with part of corrugated end surfaces at both ends of an inner fin 11 in a manner similar to the first embodiment, a bottom surface of a first side panel projects toward the inside of a container 5 along the corrugated end surfaces at both ends of the inner fin 11. Although the bottom surface of the first side panel projects along substantially the entire end surfaces at both ends of the inner fin in the second embodiment, a part of the bottom surface of the first side panel may project in the third embodiment.

Figure 8:
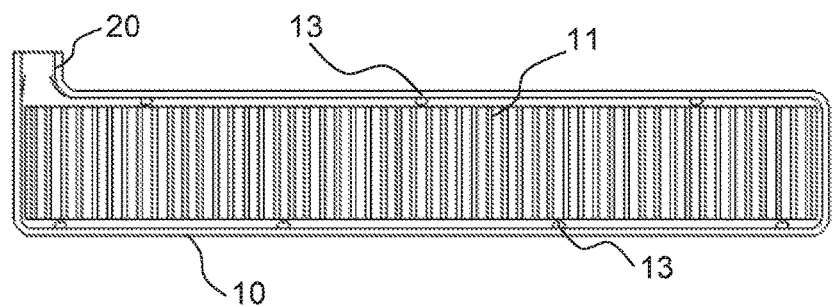
FIG. 8 is an exploded front view of a cold storage medium container according to a fourth embodiment.

FIG. 8 is an exploded front view of a cold storage material container according to a fourth embodiment. In this embodiment, a corrugated pattern of an inner fin 11 is formed in parallel with longer sides of an inner fin 11 and a cold storage medium container 5. In each of the first to the third embodiments illustrated in FIGS. 3 to 7, the inner fin 11 having the corrugated pattern parallel to the shorter sides of the cold storage medium container 5 is used. Alternatively, as described in the fourth embodiment with reference to FIG. 8, an inner fin 11 having a corrugated pattern parallel to the longer sides of the cold storage medium container 5 may be used. In this case, as engagement portions 13, embossed projections are formed in portions of a bottom surface of the cold storage medium container 5 along the longer sides thereof so as to be engaged with part of corrugated end surfaces at both ends of the inner fin 11. In this manner, gaps are formed between the corrugated end surfaces at both ends of the inner fin 11 and an inner wall along the longer sides of the cold storage material container 5. In the fourth embodiment, the engagement portions 13 are not limited to the embossed projections, and may be parts of the bottom surface of the first side panel 10 projecting inward as described in the second and the third embodiments.

In the foregoing embodiments, the engagement portions 13 projecting toward the inside of the container body are formed on the bottom surface of the first side panel 10. However, the present invention is not limited to this example, and the engagement portions 13 may be formed on a side surface of the body of the cold storage medium container 10 so that the inner fin 11 can be positioned in the body of the container.

REFERENCE SYMBOL LIST 1 (1A, 1B) upper header tank
2 (2A, 2B) lower header tank
3 refrigerant pipe
4 fin
5 cold storage medium container
6 side plate
7, 8, 9 partition
10 rectangular container member (first side panel)
10a flat surface
11 inner fin
12 rectangular container member (second side panel)
12a flat surface
12b projection
13 engagement portion
20 cold storage medium filling opening
P1 first pass
P2 second pass
P3 third pass
P4 fourth pass

The invention claimed is:

1. A cold storage medium container that is in contact with refrigerant pipes of a cold storage heat exchanger by brazing and contains a cold storage medium for storing cooling capacity of a refrigerant, wherein
peripheral edge portions of a pair of rectangular container members are brazed to each other to form a rectangular container body having a cold storage medium filling opening at an end thereof, the container body has therein an inner fin which is formed in rectangular shape composed of two long sides and two short sides and of which a cross section in parallel with the short sides is formed in a corrugated shape, and is filled with the cold storage medium through the cold storage medium filling opening therein, engagement portions project toward an inside of the container body to engage a part of a corrugated short sides at each end of the inner fin toward the short sides in the direction in parallel with the long sides, to thereby position the inner fin in the container body, a gap is disposed between the corrugated short sides of the positioned inner fin and an inner wall of the container body, the engagement portions which project toward the inside of the container body protrude from a bottom surface of the container along the corrugated short sides of the inner fin, and the corrugated short sides of the inner fin are formed in parallel with short sides of the container body.

2. The cold storage medium container according to claim 1, wherein the cold storage medium filling opening is configured to open toward the direction in parallel with the short side of the container body and to communicate with the gap.

* * * * *